Oct. 4, 1966
T. R. WELCH
3,276,630
PROPORTIONING DISPENSER WITH TEMPERATURE
CHANGE RESPONSIVE ACTUATOR
Filed July 15, 1964
7 Sheets-Sheet 1
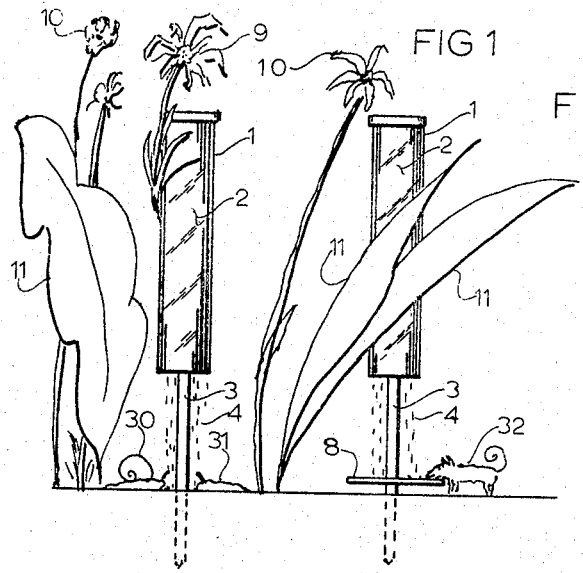
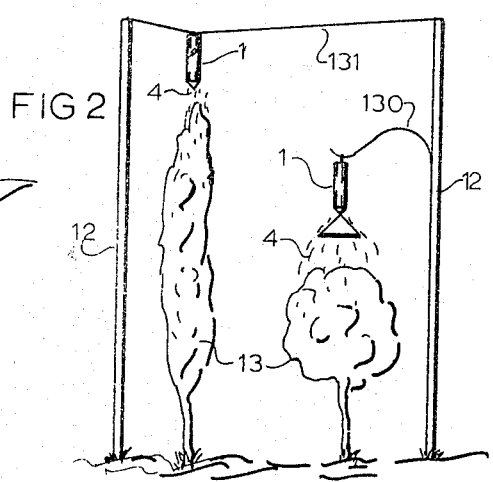
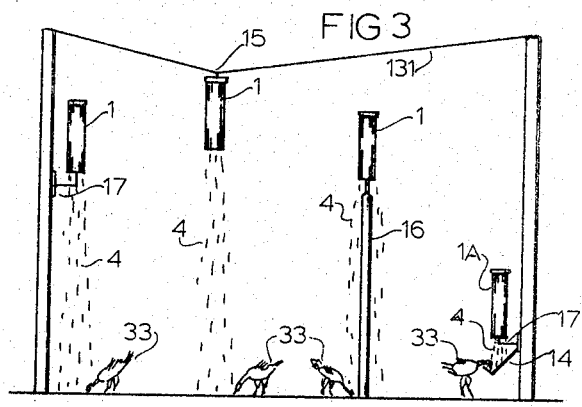
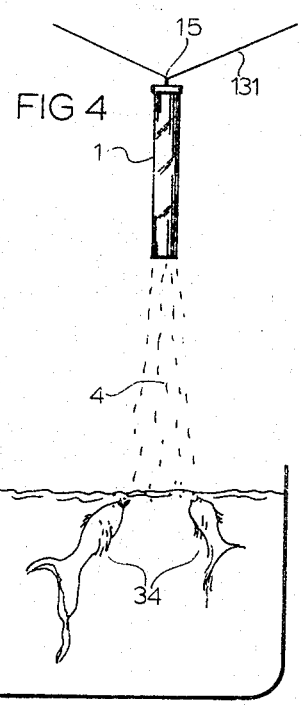
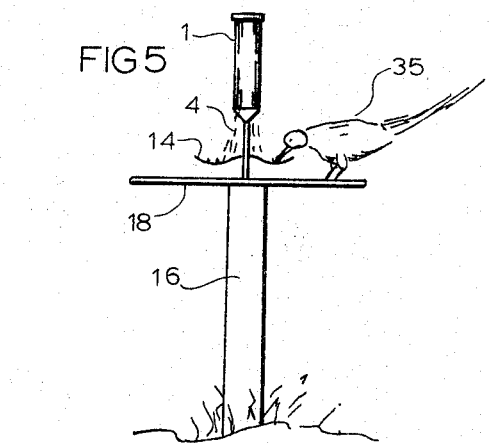
INVENTOR.
BY Thomas Ross Welch

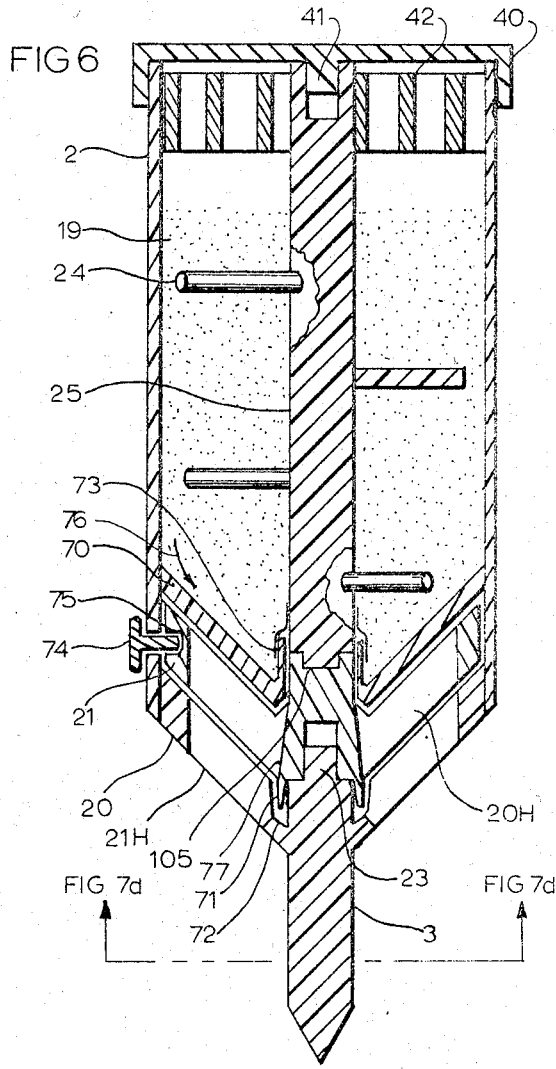
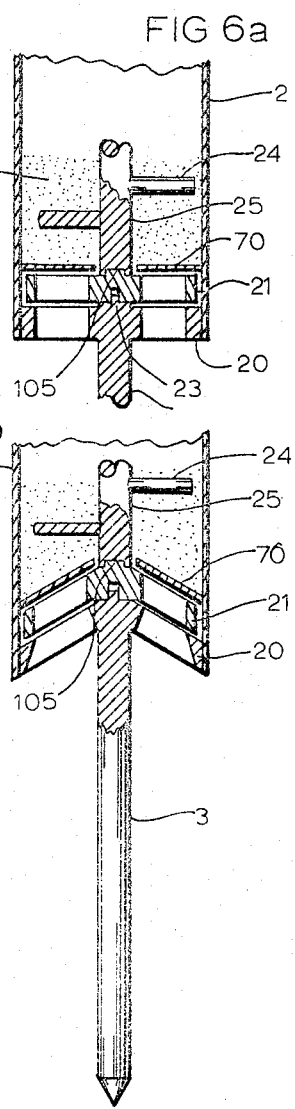
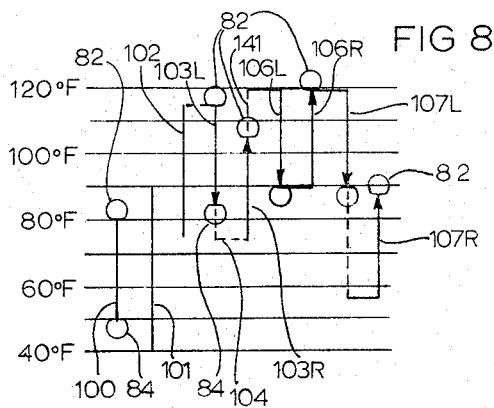

Oct. 4, 1966 T. R. WELCH 3,276,630
PROPORTIONING DISPENSER WITH TEMPERATURE
CHANGE RESPONSIVE ACTUATOR
Filed July 15, 1964 7 Sheets-Sheet 3
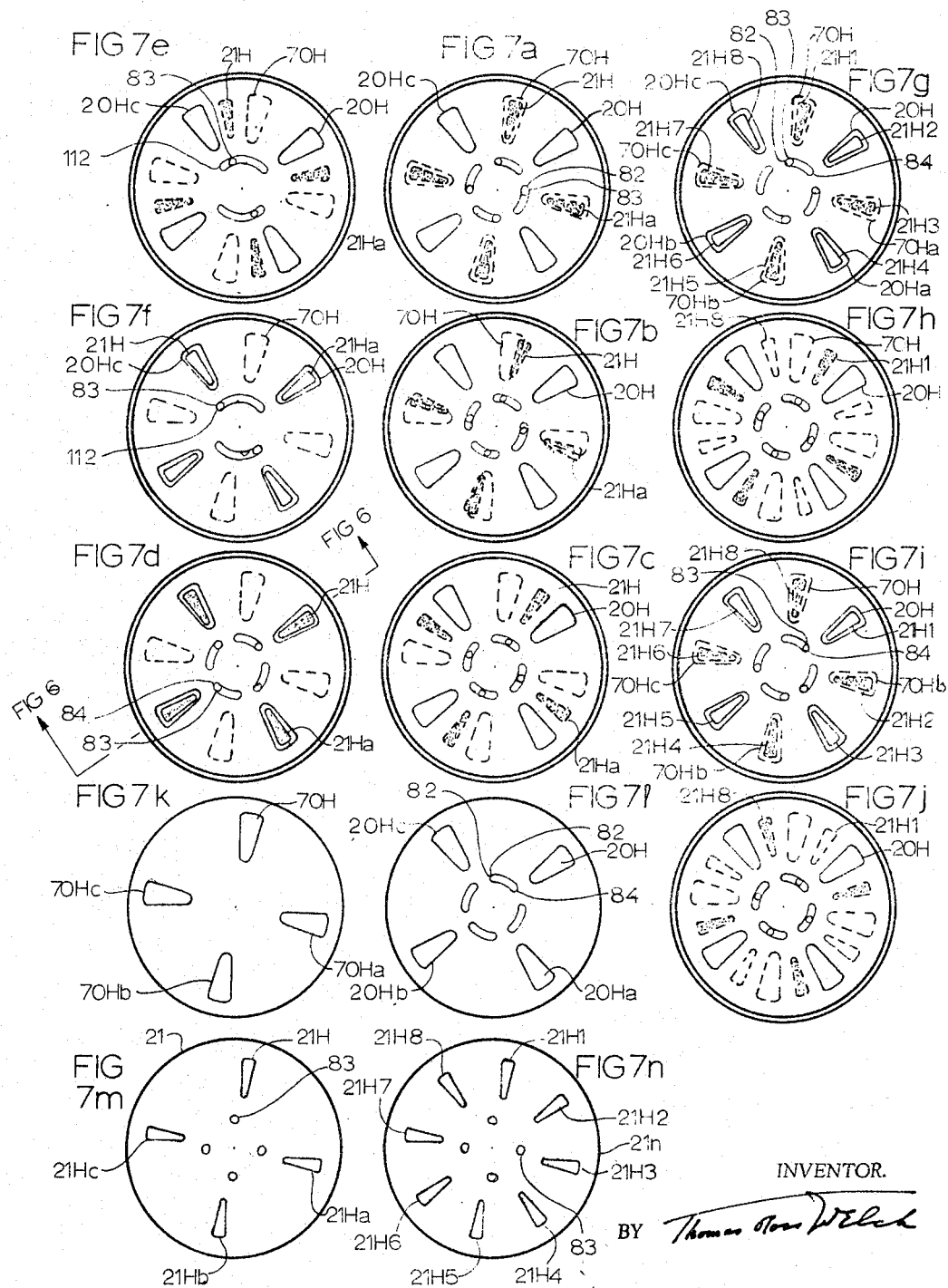
INVENTOR.
BY Thomas Ross Welch

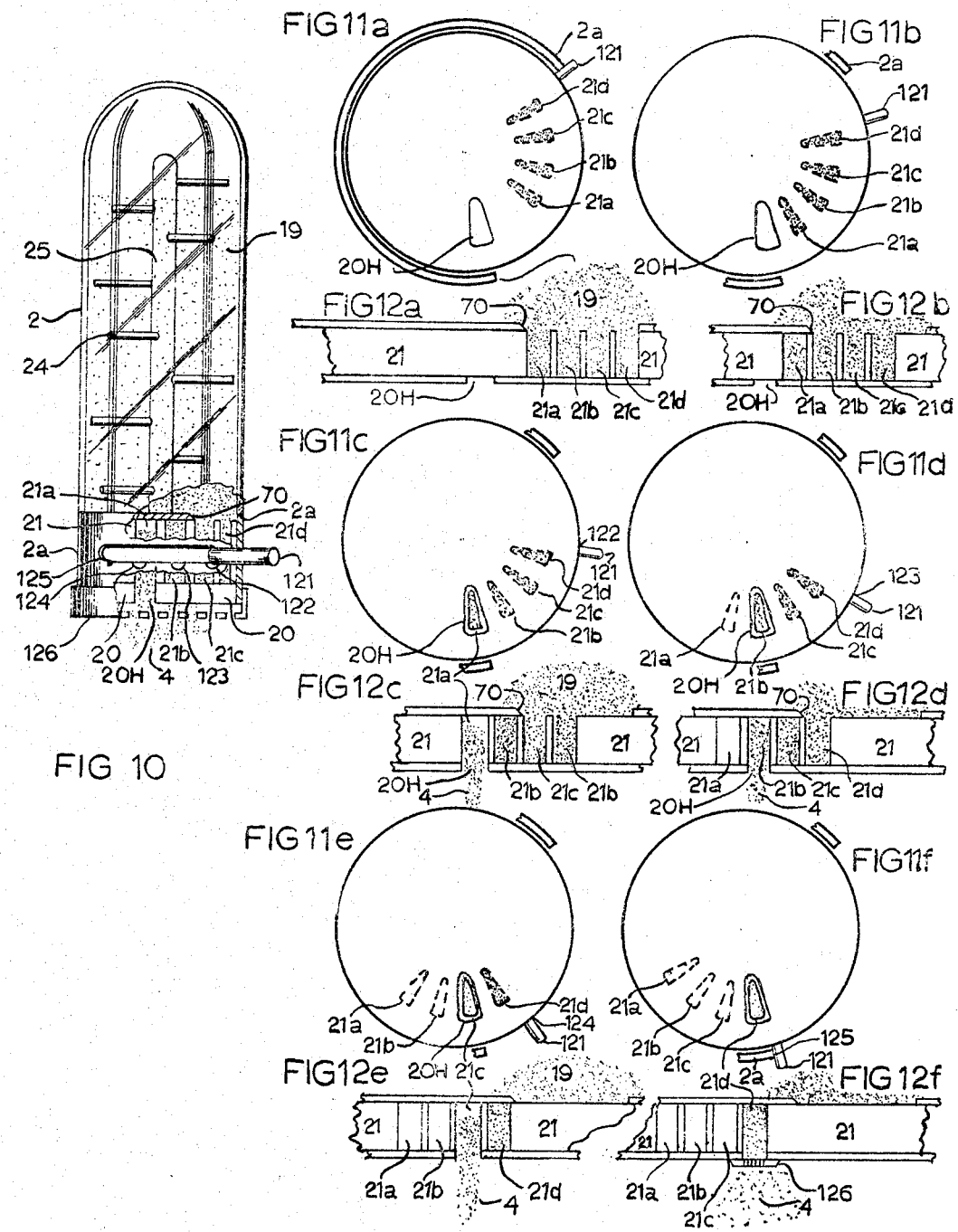

Oct. 4, 1966  T. R. WELCH  3,276,630
PROPORTIONING DISPENSER WITH TEMPERATURE
CHANGE RESPONSIVE ACTUATOR
Filed July 15, 1964  7 Sheets-Sheet 7
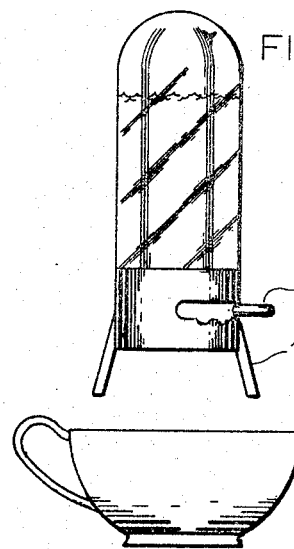
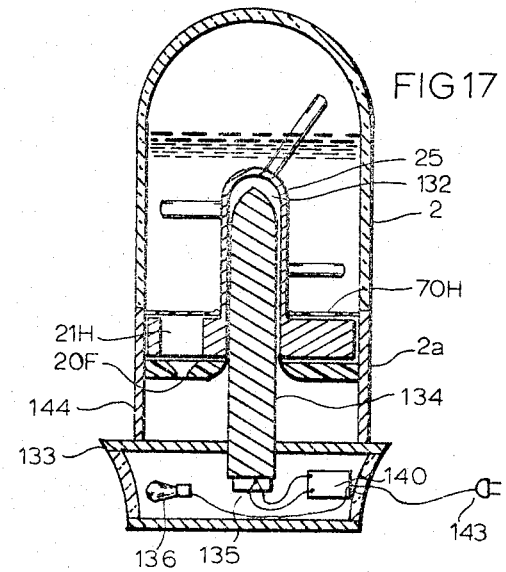
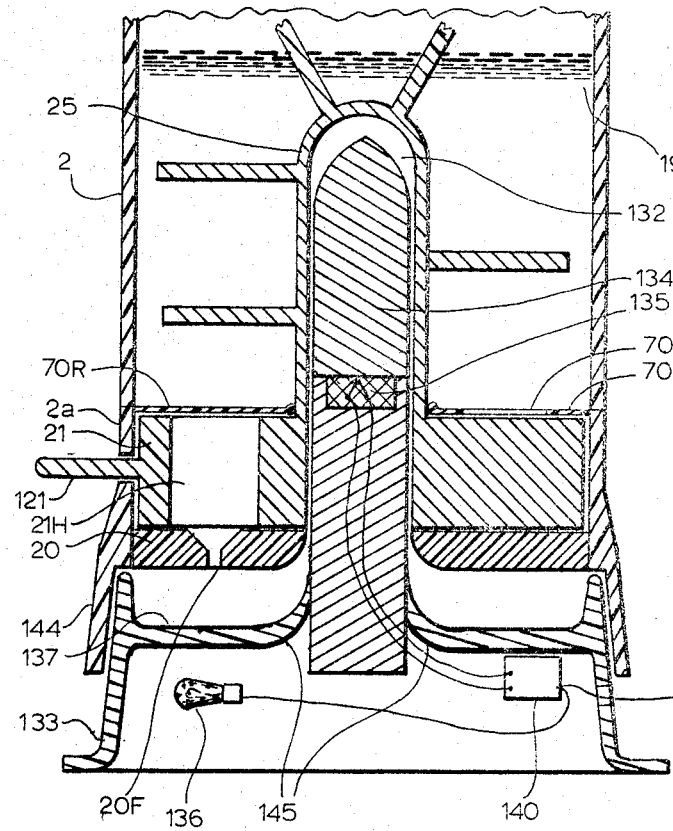
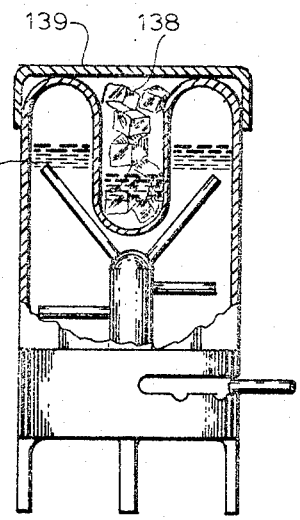
INVENTOR.
BY Thomas Ross Welch

3,276,630
PROPORTIONING DISPENSER WITH TEMPERATURE CHANGE RESPONSIVE ACTUATOR
Thomas Ross Welch, 520 Moreno Ave.,
Los Angeles, Calif.
Filed July 15, 1964, Ser. No. 382,971
8 Claims. (Cl. 222—54)

This specification describes a new and improved invention for a dispenser. This dispenser is automatic in its operation. It can be used for dispensing feeds for animals, birds, fowl or fish. It can be used for dispensing baits, poisons, insecticides, or chemicals for reproduction control. The invention can be used for dusting insecticide or other control materials over plants, bushes, trees.

This invention can be used for garden pests such as snails, slugs, beetles, caterpillars, ants and other types of insects. It can be effective in most pest control programs as will become apparent in the following description.

One of the great disadvantages of prior methods is that if the poison was hand dispensed it required constant and persistent attention in the following manners. For snails and slugs in particular unless the poison is dispensed every few days, depending upon temperature, at least every 6 to 10 days, the new born snails that were only eggs at the first campaign, now grow to be almost as big a menace as before.

The average home gardener cannot devote enough continuous attention to his extermination campaign to make it effective.

Further, a technical problem exists that to make a poison so strong as to be effective in, "The once in a while" hit and miss dispension program of the average gardener requires that it be almost to the point where it is not attractive to the garden pest. It would be far better to have a less lethal dose that would kill the pest after being eaten several days.

A further advantage of the less lethal dose is the lesser danger of poisoning passing animals such as dogs or cats, or even a child who might sniff or taste the poison. Cats have been known to merely walk through a garden that has been sprinkled with ordinary powerful snail poison and later by licking their feet been seriously poisoned.

In dispensing any poison there is always the hazard of contaminating the person that is distributing the poison, through skin contact, breathing, an open wound or directly to the blood stream through the eye, are to name only a few of the possible ways. Of course the more lethal the dose the greater the danger.

This invention solves these problems and many others as will be pointed out in the following description.

Instead of spreading the poison around and accidentally contaminating vegetables, especially such types as lettuce and cabbage, the use of this invention lets the dispenser place the poison at exactly the selected position so that no poison can get on the plants.

In methods of placing poison today, if a rain comes after the poison has been placed, or the garden is watered the poison is either partially or completely dissipated. This then can negate one of the sporadic bursts of energy toward exterminating the pests.

With this invention since each day new poison is automatically dispensed, the dispersion by rain or watering does not leave large gaps in the control program.

In the use of the feeder for control of animals in the wild such as birds that are becoming pests, the fact that the dispenser is automatic and can be left unattended by humans for long periods of time makes the program more effective since the wild animals can feed without the fear that comes from frequent human visits.

A further development of the dispenser for more general use, where the combination of the stirrers, with modified actuating means for proportioning amounts in relation to amount of actuation, have made a new and improved device as is described in the specification.

A further development again incorporating the dispenser and stirrer along with a stand and cooling elements have given a further advantage of an invention that in addition to being an aid and improvement is further a protector of public health, especially when used in restaurants and the like, by keeping the material, cream, cooled and therefore from spoiling, as explained in detail in the specification.

This dispenser is still further a protector of public health, when used in restaurants, in that it keeps the cream completely covered and dispenses from the bottom, in contrast to pitchers of cream, as now commonly used which are often open or partially open at the top and therefore can receive germs from dust, coughs and handling.

Still, a further advantage is that because the product can be built so inexpensively, the handling of the cream by the restaurant staff can be eliminated by filling the dispenser at the creamery, under ideal sanitary conditions. In this manner the cream is never exposed until the moment it is dispensed directly into the user's cup. After the dispenser is empty the dispenser can be discarded.

The further advantages of this invention are as follows, and as will become apparent in the detail specification.

This invention provides the constant, daily attention to a pest ridding campaign by automatically dispensing some poison, usually once or twice a day.

It eliminates the need to handle the poison directly, thereby reducing or eliminating the chance of contamination by the operator.

The constant program allows the use of a less lethal dose and thereby allows the bait to be more attractive to the pest.

In some cases, particularly such as rodents, the constant program of food being available attracts others of the colony so that the effectiveness of the program is greater.

The invention conserves the time of the handler. He can actually establish an entire season's campaign at one time.

The invention can be attractive to such places as the garden as well as serving its function.

The invention can proportion the amount to be dispensed without danger of contamination for the next user.

The invention can be mounted or on a stand in order to keep it from being contaminated from touching the table.

The invention can be cooled to prevent the material from spoiling.

FIGURE 1 shows the invention in a side or plan view placed in the garden, in this case by inserting the post into the ground.

FIGURE 2 shows a plan view of the dispenser suspended over a bush or tree in order to dispense over the plant.

FIGURE 3 shows a plan view of the dispensers in use in a chicken yard. One is suspended, one is mounted on a post and two mounted on a wall bracket.

FIGURE 4 is a plan view and illustrates the dispenser being used to feed fish.

FIGURE 5 shows a plan view and shows the dispenser in being used for feeding of birds.

FIGURE 6 is a cross section and shows the dispenser in one of its preferred forms with the dispensing portion of the mechanism in a V-shape.

FIGURE 6a is a cross section view and shows the same basic mechanism as FIGURE 6 with a flat dispensing portion.

FIGURE 6b is a cross section view and shows the mechanism as FIGURE 6 with an A-shaped dispensing portion.

FIGURES 7a, 7b, 7c and 7d show a view from the bottom looking up toward the dispensing portions and showing relation of dispensing elements for portioning out the material as the temperature increases (or decreases). Termed one directional dispensing.

FIGURES 7e and 7f are views from the bottom showing relation of dispensing elements for 2 direction dispensing, on both increasing and decreasing temperature.

FIGURES 7g, 7h, 7i and 7j are views from the bottom showing the relation of the dispensing elements for 2 direction dispensing in an improved manner.

FIGURE 7k is a bottom view of the sealer element only.

FIGURE 7l is a bottom view of the releaser element only.

FIGURES 7m and 7n are bottom views of the proportioner elements.

FIGURE 8 is a graph of the temperature operating range and illustrates the invention of the self adjustment feature to use all available temperature differential.

FIGURE 10 side view of a dispenser.

FIGURES 11a through f show bottom view of dispenser in FIGURE 10 showing arrangement of cavities of proportioner for dispensing in relation to movement.

FIGURES 12a through f show cross section view of the dispenser of FIGURE 10 with the dispenser portion extended in a straight line to better illustrate the dispensing as shown in the respectively lettered figure of FIGURE 11.

Figure 13:
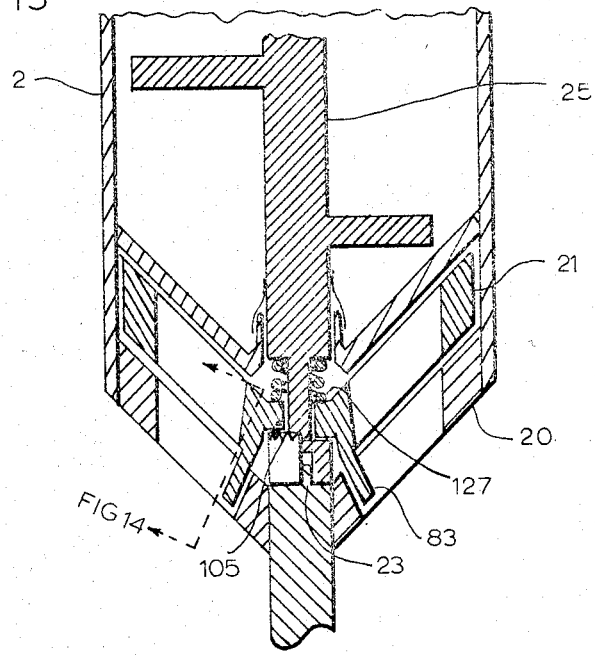

FIGURE 13 is a cross section view of the proportioning elements of FIGURE 6 to show an alternate clutch arrangement.

Figure 14:
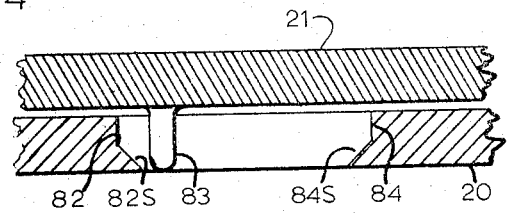

FIGURE 14 is a cross section view of FIGURE 13 taken on the radius as shown and stretched out in order to show a clutch disengaging system.

FIGURE 15 is a side view of a dispenser adapted to liquids and shown dispensing cream into a coffee cup.

FIGURE 16 is a cross section of FIGURE 15 showing the dispensing elements and the cooling elements and the dispenser stand.

FIGURE 17 is another cross section of a dispenser such as shown in FIGURE 15 with a modified stand and cooling element.

FIGURE 18 is a cut-away view of a dispenser similar to that shown in FIGURE 15 but with modified cooling means shown in cross section.

FIGURE 1 shows the dispenser 1 consisting of a container 2 supported on a stake 3 with the material 4 being disbursed to ground feeding snails 30, slugs 31, or to a rodent 32 which can feed from the ground or sometimes preferably from a raised platform 8 which can be made to fit around the stake 3.

The word material will be used throughout this specification to indicate that being dispensed. This material can be baits, poisons, insecticides, chemicals, feeds for animals, birds, fish or humans. This improvement is capable of dispensing such a wide range of materials this broad word is felt to be a good one.

Decoration, such as an artificial flower 9 can be attached to the dispenser. The other flowers 10 and shrub 11 of the garden are illustrated in order to show one of the natural elements of these dispensers.

FIGURE 2 shows the dispensers 1 suspended over a tree or shrub 13 by the post 12 and bracket 130 or by wire 131. The material 4 is being disbursed over the plant in order to control pests such as aphids, fungus or caterpillars. As previously stated, because the material will be dispensed in consistent program the material can be milder but the overall program will be more effective.

FIGURE 3 shows a side view of a typical chicken yard showing the dispenser 1, suspended at 15 on wire 131 or mounted on a post 16 or on a bracket 17. It should be pointed out this invention is not confined to any mounting means. The dispenser 1A is shown mounted over a feeding trough 14 in order that the feeding is done from the trough rather than the feed being disbursed in a random manner as shown previously.

Chickens 33 are shown but these can be turkeys, pigeons, or any other fowl or even animals such as rabbits or guinea pigs to mention a few.

FIGURE 4 shows the dispenser 1 being used to feed fish 34. This can be used by game wardens for fish in the wild in such illustrative cases as to aid the growth of fish in stocked streams. The dispenser can be used on trout farms to automatically feed the fish or on home aquariums to feed the fish, especially during vacations of the homeowners.

FIGURE 5 shows the dispenser 1 as a bird feeder, either to aid in the feeding or as a dispenser of a population control material. The dispenser is shown with a trough for feeding the bird 35 with the entire assembly mounted on platform 18 and post 16.

One great advantage using of this dispenser is that the feeding of these various types of insects, birds or animals is often best only at night as in the case of snails and slugs, or only in the morning in the case of some wild birds, or sometimes both in morning and evening as is often the case in chickens and fish. This invention allows the control of these feeding times as desired, as will become apparent in the detail description as the mechanism is described.

Some of these figures show the dispenser as a transparent material. This is to illustrate that even though transparent is probably preferred in order that the remaining stock of material can be observed, the garden use, as per FIGURE 1, might be tinted green to blend with the garden plants; the dispenser can be translucent or opaque.

FIGURE 6 shows a cross section of the dispenser 1 consisting of the container 2 both enclosing the mechanism and also containing the material 19 being dispensed.

For the purpose of aiding in the clear description of this dispenser I have named some of the elements of the dispensing portion of this dispenser. These names fit definitions as given in Webster's New World Dictionary and are:

Sealer, item No. 70 (70T). Definition: A thing that seals.

Proportioner, item No. 21. Definition: From proportion, a part, share or portion, especially in relation to the whole.

Releaser, item No. 20. Definition: To permit to be issued.

The combination of these elements which proportion and dispense the material I have termed the elements or the proportioning elements of the dispenser.

One direction dispensing—Dispensing of material upon temperature either rising or falling, not both.

Two direction dispensing—Dispensing of material upon temperature both rising and falling.

The advantage of these descriptive names will become apparent in the description.

The releaser 20 portion of the dispenser is fastened solidly to the container 2 and also to the mounting stake 3.

A cooperating moving proportioner 21 is positioned above 20 in a rotatable manner, pivoting for instance on 23 which can be an extension of the top of post 3.

The center shaft 25 can be attached firmly to 21 (for the first description can be considered so. This specification will show an added improvement by adding the clutch 105) and pivots at the top on projection 41 of lid 40. The relative long length of 41 and 23 is to make up for tolerances build ups of several parts such as container 2. The bimetal helix coil 42 is attached to shaft 25 at the center and to enclosure 2 at the outside. Thereby developing a rotating torque on the shaft 25 whenever a temperature change causes bimetal 42 to develop a force. A bimetal is shown but other temperature sensitive drive elements can be employed such as a temperature sensitive bellows.

Projections or paddles 24 are mounted to 25 and act to stir the material each time 25 rotates. This is often an important advantage because it keeps the material loose and ready for dispensing and allows for better disburse even over long periods of being contained awaiting dispensing.

Sealer 70 is mounted above proportioner 21 by fastening to container 2.

Cooperating holes are provided in 20 and 21 and 70 for the dispensing of the material through these members when the disc 21 is rotated by the temperature actuated bimetal 42. The details typical of these holes will be described further in the specifications.

FIGURE 6*a* shows a similar mechanism to FIGURE 6 except the dispensing discs are flat and often give a wider disperse of material.

FIGURE 6*b* is again a similar mechanism except the dispersing discs are A-shaped, and can be used where wider areas are to be covered.

One of the advantages of the V-type dispenser disc is that provisions can be taken to keep the material from wedging between moving parts and after a period of time possibly stopping the dispensing action. Some of these advantages are that the V-shape of sealer 70 moves the material in the direction of arrow 76 and away from the space between proportioner 21 and the case 2. Cap 73 is fastened to 25 and acts as a skirt to keep material from between shaft 25 and sealer 70. The slant of the hole 77 in proportioner 21 directs the material outward from pivot 23 which is further protected by skirt 71 on proportioner 21 which extends into groove 72 in releaser 20 leaving only one direction for the material to go and that is out of the cooperating hole in 20 that will be described in detail in a moment.

Locking pin 74 is inserted through the container 2 and into a cooperating hole 75 in moving proportioner 21 in order to lock the disc 21 in place. Upon placing the dispenser in operation this pin 74 is removed and the bimetal can now move disc 21 and the dispenser can disperse material. Unless the mechanism was locked the dispenser would be operating all the while it was in storage and possibly would have dispensed all of its material before the shipping cartons were opened.

FIGURES 7*a, b, c,* and *d* show the view from the bottom looking toward the dispensing portion and showing the relationship of the sealer holes 70H, the proportioner holes 21H and the releaser holes 20H.

The cycle of dispensing operation to be described first is with dispensing in one direction of temperature change only. This could be either rising or dropping temperature depending upon the direction of placement of bimetal 42. For the sake of description we will assume that the rotation of proportioner holes 21H is in the clockwise direction on dropping temperature. Dispensing as is about to be described could be used as a snail bait dispenser where the bait would be dispersed in the evening. Hole 70H is shown as a larger size and in dotted line, hole 21H is small size and dotted. Hole 20H is larger and solid line.

FIGURE 7*a*, hole 21H in proportioner 21 has been lined up with hole 70H in sealer 70 because the temperature has been high and bimetal 42 has held disc 21 (see FIGURE 6) against stop 82. This allows the material to fill proportioner 21H through sealer 70H.

As the temperature drops the disc 21 starts to turn in the clockwise direction. FIGURE 7*b* shows the sealer 70 and sealer hole 70H partially closing off the proportioner hole 21H. FIGURE 7*c* shows the proportioner 21 half way through its travel and sealer hole 70H is now completely sealed off. Dispenser 21H is filled with material.

As the disc continues to rotate proportioner hole 21H and releaser hole 20H begin to line up and the material begins to disperse. When holes 20H and 21H coincide as in FIGURE 7*d* the stop 83 is against stop 84 and all of the material will be dispersed and one half of the operating cycle is complete.

To complete the cycle the temperature rises, bimetal 42 turns proportioner 21 and hole 21H in the counter clockwise direction from 7*d* to 7*c* and 7*b* when as holes 21H and 70H again begin to line up, as in FIGURE 7*a* the material again begins to fill hole 21H which completes the cycle. The rotation of shaft 25 rotates stirrers 24 which help agitate the material so that by the time holes 21H and 70H coincide as shown in FIGURE 7*a* the hole 21H is again filled. This is the end of the complete cycle. Upon a drop in temperature the cycle will again start.

Since the sensitivity to temperature change, which I will hereafter call temperature differential, can be regulated by the length of the bimetal coil and thickness of the bimetal material a temperature differential should be selected at least great enough to keep the dispenser from dispensing for every cloud that may cast a shade and yet small enough a temperature differential to obtain dispensing operation from the temperature change from day to night. A nominal range of 30° F. has been selected as a temperature differential that would fill these requirements but this could be modified to fit the average temperature change in different parts of the country, such as Western Desert vs. North Atlantic Coast. The engineering calculations for the selection of the bimetal are well known in the engineering field, in texts and suppliers literature and therefore will not be repeated here.

Additional temperature change will only increase the force against stop 82 or 84, or operate against the clutch 105 as will be described.

The bimetal is designed to operate the proportioner 21 through the cycle just described, or cycles to be described, with the temperature differential selected.

The amount of movement of the proportioner, in circular degrees, is a function of the number of sections the dispensing portions have been divided into, the type of cycle and the size of the holes. The illustrations used in these figures have been 16 sections. This can be any number but there is an advantage in the use of certain numbers of sections as will be described later.

If dispensing upon rising of temperature is wanted the placement of the stops can be changed so that the movement of disc 21 is only allowed in the opposite direction, and hole 21H finally dispenses through hole 20HC. Or the direction of rotation of bimetal 42 can be reversed so action is exactly as originally described for FIGURES 7*a*, 7*b*, 7*c* and 7*d* except direction of clockwise movement is now on rising temperature.

When dispensing is desired on both increasing and decreasing temperature cycles one way to accomplish this is that instead of stop 82 shown in FIGURE 7*a*, a longer travel and stop 112 be used as shown in FIGURES 7*e* and 7*f*.

The cycle for increasing and decreasing is longer than the one just described.

Since, however, the first part of the cycle is the same it will be even more clear to use the same descriptions as per FIGURES 7*a*, 7*b*, 7*c* and 7*d* to stop 83 and then as temperature rises the operations go back to 7*a*. This is now however only the first part of this new cycle.

In this position 7*a* the proportioner 21H will refill through sealer hole 70H.

As the temperature continues to rise the proportioner 21H continues to turn counter clockwise as shown in FIGURE 7e, and continues until stop 83 reaches stop 112 as shown in FIGURE 7f at which time proportioner 21H dispenses through releaser 20HC.

On the next rising temperature the proportioner 21 rotates back to 7e and then to 7a (without stop 82). This now completes the full operating cycle for dispensing on both rising and falling temperatures.

One of the advantages of placing the bimetal at the top of the dispenser is that it will feel the full effect of the heat of the sun and will therefore go through a wider variation or differential between day hot and night cold. This has the advantage of allowing the motion of the bimetal to actuate disc 21 in a mid range of the mean daily temperature differential.

FIGURE 8 illustrates the action over the temperature range as shown in the vertical scale. To the left, line 100 is to represent the differential operating range of 30 degrees F. of the bimetal between stops 82 and 84 as long as the temperature range in a day was greater than 50 degrees F. low and 80 degrees F. high. But if, during a heat wave, the temperature in the day would rise to 115° F., line 102, and not drop down to 50° F., such as shown by line 103L, the mechanism would not leave stop 82 far enough to actually dispense any material.

The clutch as illustrated by 105 in FIGURE 6 overcomes this disadvantage in that this clutch always operates the dispensing discs in the first change of direction of the temperature. The clutch 105 is inserted between shaft 25 and proportioner 21. As long as the proportioner is not restrained by the stops 82, 84 or 112 the motion from bimetal 42 to shaft 25 is transferred through clutch 105 to proportioner 21 and the material 19 is dispensed as previously described. When proportioner 21 comes to the stop 82, 84 or 112 it stops, but shaft 25 continues to be driven by bimetal 42 and a force is developed at clutch 105 which allows it to slip or override until the temperature extreme is reached. Upon a change in temperature direction the clutch would engage and the proportioner would be driven in the opposite direction with the first temperature change of the required degrees 30 in this illustration.

To illustrate this new action refer again to FIGURE 8. Again, considering that 30° F. has been the temperature change designed to develop the dispensing operation as previously described, then line 103L would represent the first half cycle till stop 84 was contacted, thereafter clutch 105 would over-ride as shown by line 104 until the temperature change stopped and bimetal 42 ceased to drive shaft 25.

When the temperature changed direction, the clutch 105 would immediately begin to drive disc 21 as shown by line 103R and would drive it during the first 30 degrees of the temperature change. The balance of the temperature rise as represented by line 141 would consist of clutch 105 over-riding. Note that now the dispenser has operated where in the previous description of the temperature change from 115° F. to 75° F., line 103L, without the clutch, the dispenser would not operate.

To further illustrate, if the next day a temperature change of only 30 degrees was experienced between day and night, as represented by line 106L and 106R the dispenser would still have operated fully.

If the next day a sudden drop occurred to a new low and the temperature never came back up to the previous day's high, the dispenser would still completely operate since it would have operated in each case in the first 30° F. temperature change as represented by lines 107L and 107R.

The relative motion between disc 21 and shaft 25 is described as a slip clutch, other means such as teeth or dogs could be used. Element 105 could be teeth such as a gear with a slightly slanting tooth face which would cause a jostling action as the over-riding would occur.

An additional method would be to cause force of proportioner against stops to disengage proportioner from engagement with shaft 25.

This is illustrated in FIGURES 13 and 14 where clutch or gear 105 is placed in such a manner that lifting of proportioner 21 will disengage 21 from shaft 25. This lifting can be accomplished, as shown in FIGURE 14. FIGURE 14 is a stretched out section of FIGURE 13 taken on the radius as shown. Stops 82 and 84 are modified with slopes 82S and 84S which tend to lift the proportioner 21 as stop 83 contacts 82S or 84S. When 83 comes against vertical portion 82 or 84 it is stopped.

The weight of proportioner, especially with the material 19 will usually return the proportioner 21 to engagement with the clutch or teeth 105 but in case additional assurance is desired a spring 127 can be inserted between 25 and 21 to return 105 to engagement.

Actually the proportioner 21 will fall back as every tooth of 105 is passed over because it will then be free to allow 83 to slide down 82S or 84S and the next tooth will push it up these slopes till it is again disengaged. This jostling action is actually an advantage since it tends to shake out any material that might be caught in any of the proportioner elements.

The clutch 105 can be inserted at other positions such as between bimetal 42 and shaft 25 or along shaft 25 or even between bimetal 42 and container 2 to illustrate a few. Placing the clutch in the general position as shown has the advantage that even though proportioner 21 is stopped the stirrers 24 continue to stir the material because shaft 25 continues to rotate. When dispensing is desired on both increasing and decreasing temperature cycles the development of having a relative motion between shaft 25 and disc 21 is even more important because the temperature range required for the dispenser to go through a complete half cycle from FIGURES 7d to 7f is greater.

The amount of motion required is a result of several factors, one the type of function, dispensing at one temperature extreme or both, and two the width of the holes.

The width of the holes, the thickness of proportioner 21 and the number of holes control the amount of material being dispensed with each operation.

The most efficient use of holes would be by dividing the proportioner into 8, 12, 16 or 32 sections. 16 section divisions are shown in FIGURE 7. These divisions allow for the same discharge hole 20H to handle the two proportioner holes 21H and 21HA; FIGURES 7a through 7f. One on increasing and one on decreasing temperature. In other words there are no blank spaces, no waste areas.

A further advantage of dividing the proportioner elements of the dispenser as described above is illustrated in FIGURES 7g, 7h, 7i and 7j where two direction dispensing, dispensing on both rising and falling temperatures is accomplished in the smaller movement than just described for FIGURES 7a through 7f. The actual movement is the same as for one direction dispensing, upon rising temperature only or falling temperature only. Both descriptions are necessary in case a builder does not take advantage of the divisions as described and also shown in a following chart and in FIGURES 7k, 7l, 7m and 7n. These figures show the proportioning elements of the dispenser as they would each appear when divided into 16 sections. Other division relationships will be obvious from these descriptions.

These FIGURES 7k, 7l, 7m and 7n show the individual elements. All other figures in FIGURE 7 show the interrelations of the elements. 7k shows the sealer disc 70. Four holes 70H, 70Ha, 70Hb, and 70Hc are shown. 7l shows the releaser 20 with its 4 holes 20H, 20Ha, 20Hb and 20Hc.

FIGURE 7m shows the proportioner with its 4 holes 21H, 21Ha, 21Hb and 21Hc as used in the descriptions of FIGURES 7a through 7f.

FIGURE 7n shows the proportioner 21n for use in this new improvement of a small movement two direction dispenser. Note proportioner 21n has 8 proportioner holes 21H1 through 21H8.

Descriptions for FIGURES 7a through 7f used elements 70 of FIGURE 7k, 20 of FIGURE 7l and 21 of FIGURE 7m. The following description of FIGURES 7g through 7j will use 21n of FIGURE 7n in place of 21 of FIGURE 7m but otherwise 70 and 20 will be the same.

FIGURE 7g shows the elements in relation to each other with proportioner holes 21H1, 21H3, 21H5 and 21H7 being filled through sealer 70 holes 70H, 70Ha, 70Hg and 70Hc respectively at the start of the cycle. Note 83 is against stop 82.

FIGURE 7h shows the proportioner 21n rotating clockwise and shows proportioner holes 21H1 through 21H8 are sealed.

FIGURE 7i shows the proportioner 21n rotated to the end of its half cycle with 83 against stop 84 and proportioner holes 21H1, 21H3, 21H5 and 21H7 are dispersing respectively through holes 20H, 20Ha, 20Hb and 20Hc.

While this dispersing is going on proportioner holes 21H2, 21H4, 21H6 and 21H8 are being filled through sealer holes 70Ha, 70Hb, 70Hc and 70H respectively. This completes one half cycle.

FIGURE 7j shows the proportioner rotating in a counter-clockwise position and is the same as FIGURE 7h except that the alternate proportioner holes are filled with material. This counter-clockwise motion will continue until the position shown in FIGURE 7g is reached when proportioner holes 21H2, 21H4, 21H6 and 21H8 will dispense through the coinciding releaser 20 hole and while these are releasing holes 21H1, 21H3, 21H5 and 21H7 are filling with material 19. This completes the cycle.

An additional means of controlling the amount of material dispensed would be to cover some of the release holes 20H with a blank cover similar to that shown as 126 in FIGURE 12f, except without the holes.

When such a blank cover is used on one of the dispensers such as shown in FIGURE 7f or 7g, the amount of material being dispensed can be varied widely by simply covering from none to 3 in the case of FIGURE 7f or none to 7 in the case of FIGURE 7g. If more proportioner divisions are provided even greater selective control is available. Such control is desirable and can be illustrated in part by reference to FIGURE 4 where such control would allow feeding of small or large stocks of fish.

FIGURES 7m and 7n show the stops 83 as projections or pins on proportioner 21 fitting into slots or openings on 20 and operating by coming to a stop when the pin 83 has rotated to the end of the said slot or slots indicated as stops 82, 84 and 112 in FIGURES 7a through 7j. This representation in FIGURES 7a through 7j is schematically shown in order to be keeping the description of the invention clear. Four pins and slots are shown, except for FIGURES 7e and 7j, only one is actually needed. Four would have the advantage that the invention of the lifting action as described in FIGURES 13 and 14, to disengage the clutch 105, would be more even with 2 than 1 and still more even with 4. The stops can be used several other places, such as on the side by pins, such as 74 fitting into a groove such as 75. Even shaft 25 or stirrers 24 could be used as stops but an additional advantage of the preferred pins and slots as shown and described herein is that they are in the natural direction of flow of the material being dispensed so that any material getting into the slot can only flow on through.

Circular motions have been shown for the dispensing action throughout this description; it is recognized these motions can be linear or straight line.

The advantage of smaller sections can be seen by the smaller movement needed per half cycle.

| | Required Movement per Half Cycle | |
|---|---|---|
| | One Direction Dispensing | Two Direction Dispensing (Except method of FIGS. 7g thru 7j) |
| 3 sections | 360° | (¹) |
| 5 sections | ²216° | 360° |
| 8 sections | 135° | 225° |
| 12 sections | 90° | 150° |
| 16 sections | 67.5° | 112.5° |
| 32 sections | 33.7° | 56.3° |

¹ Not applicable.
² 144° waste space.

Figure 9A:
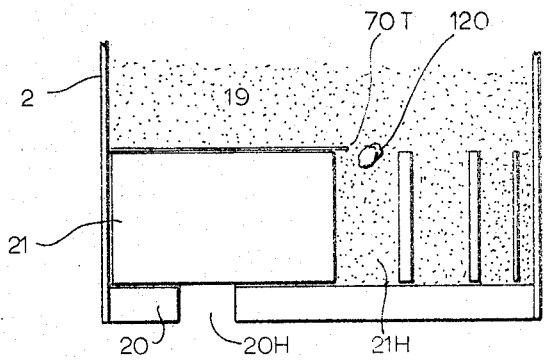
FIGURES 9a, 9b and 9c and 9d are cross sections and show the advantage of the thin sealer to present invention.

In the dispensing of granular material, unless the granules are kept to accurate size, which is often difficult and expensive, as the sealer 70 begins to close the hole it will often hit a relatively large granule 120 as shown in FIGURE 9a, with the result that unless the operating power to the dispenser is great enough to break this granule the dispenser can jam.

A further improvement in dispensers which reduces or eliminates this jamming is shown in FIGURES 9a, 9b, 9c and 9d where the sealer 70 is made of a relatively thin and flexible material. Some of the preferred materials are the plastics such as polyethylene or Mylar.

Depending upon the material used the thinness ranges from a low of approximately .004 to a high of .025 inch.

FIGURE 9a shows the proportioner element filled with material 19. Note larger granule 120 that came to rest in line with closing action of 70T.

The thin sealer now being described, can be used throughout these descriptions and therefore sealer 70 will represent a thin or thick sealer. 70T will represent a thin sealer only where its thin action is being described.

Figure 9B:
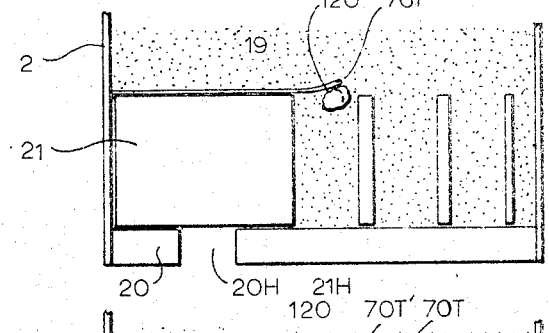

FIGURE 9b shows the thin sealer 70T that has struck particle 120 and deflected around the particle. Because 70T is thin and flexible it can deflect and bend and still continue to close off or seal the proportioner hole 21H from the main reservoir of material 19.

Figure 9C:
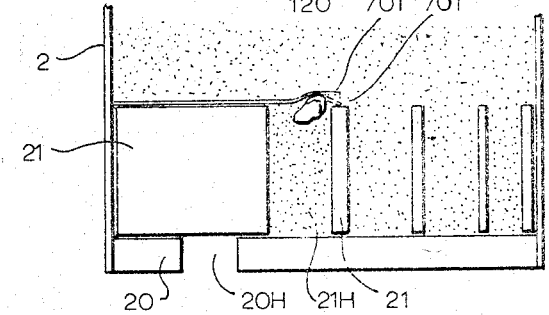
Figure 9D:
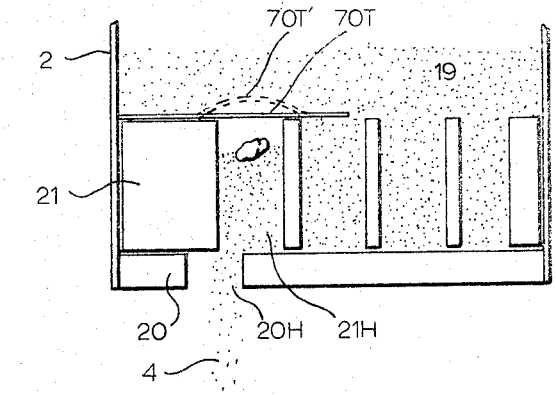

FIGURE 9c shows the sealer 70T in the sealed off position. Position 70T' shows the worst position of 70T, in case it didn't return to the partition of 21, but FIGURE 9d shows that even if this occurs the dispenser will seal off when the material is dispersed since it will let the material leave contact with 70T' and let it return to position 70T where it will seal. Both the flexibility of 70T and the weight of the material 19 will return 70T' to the position 70T of FIGURE 9d.

In the case illustrated the dispenser might be dispensing slightly more material 19 because of the upward movement of 70T as illustrated in 9a, 9b, and 9c but this is usually within a satisfactory tolerance of good measurement and the allowable tolerance can be controlled by the relative flexibility of the material chosen for 70T, which choice of thickness will depend upon the type of material 19 being dispensed, including such consideration as particle size and whether it is gritty.

FIGURE 10 is a side view of a dispenser for sugar or cream, powdered or liquid or the like, and consists of the container 2 enclosing the material 19. The side view of the dispenser includes a partial cut-away of container 2 and lower enclosure 2a of dispensing elements and cross sections or partial cross sections of part of 2, 2a, 70 and 126. A center portion is not cut-away in order to show the actuating handle 121 and the detents 122, 123, 124 and stop 125.

The cut-away view of 21 and 20 is the view of the periphery of these parts by removing the outside enclosure 2a. This shows the working of these parts more clearly.

The assembly includes a shaft 25 and arms 24 which serve as stirring elements and a dispensing portion somewhat as previously described and shown in FIGURE 6 in that it consists of a releaser 20, a proportioner 21 and a sealer 70.

For refilling, enclosures 2 and 2a would be separatable, or the top of 2 could be made removeable.

The motive power instead of being supplied from a bimetal via shaft 25 is in this instance supplied by handle 121.

It is desirable in this instance to individually manually regulate the amount of material 19 to be dispensed and this is done by controlling the distance handle 121 is advanced. To aid in this, control marks or detents have been provided for the operator; in this case four, 122, 123, 124 and the end or stop 125.

Since, for illustration it has been selected to dispense sugar in teaspoon measures for one full stroke, the first detent would be ¼ teaspoon, the second ½ teaspoon, the third ¾ teaspoon and the full stroke would dispense a full teaspoon. One and one-half teaspoons would equal 1½ strokes.

The dispenser mechanism for performing this function is shown in FIGURES 11, 11b, 11c, 11d, 11e and 11f with FIGURES 12a through f corresponding to the same letter of FIGURE 11 to show a side view of the action in FIGURE 11. This cross section view is stretched out in a linear direction for clarity.

In FIGURE 11a handle 121 is against the stop. Material 19 can fill proportioner cavities 21a 21b, 21c and 21d, which have been engineered to a height, distance between sealer 70 and releaser 20, to proportion out one-fourth teaspoon of material (sugar). For clarity, only one set proportioner cavities are shown, obviously another set could be placed 180° from these or if needed, by dividing the proportioner into 18 sections, 3 sets of holes could be used and the thickness of the proportioner varied for size of measurements and number of dispensing holes in the manner previously described.

FIGURE 12a shows the relative positions of the proportioner holes 21a, 21b, 21c and 21d, all capable of being filled from the container of material 19. In these views the container is not shown, just the material 19.

In FIGURE 11b the handle has been moved to where cavity 21a has been sealed by sealer 70.

In FIGURE 11c the dispenser has been moved one more position to the ¼ teaspoon setting, detent 122 FIGURE 10, causing proportioner cavity 21a to be over the releaser hole 20H and the material to disperse 4 from 21a out of 20H. See FIGURES 11c and 12c.

FIGURES 11d and 12d show the handle progressed to detent 123 which is the ½ teaspoon setting and proportioner cavity 21b is shown dispersing. 21c is sealed and 21d is still capable of filling. The total of proportioner cavities 21a and 21b has been ½ teaspoon, and therefore the total dispensed material is now ½ teaspoon.

FIGURES 11e and 12e show the handle progressed to detent 124, the ¾ teaspoon setting, and proportioner cavity 21c is dispersing through releaser 20H. Cavity 21c added to 21a and 21b equals ¾ teaspoon.

FIGURES 11f and 12f show the handle progressed all the way to detent 125, the full teaspoon setting. Proportioner cavity 21d is dispersing material 4. The total of all four proportioner cavities 21a, 21b, 21c and 21d is one teaspoon of material dispensed.

Empty proportioner cavities 21a, 21b, and 21c are progressed into space between releaser 20 and seal 70, or hole 20H can be big enough to keep all 4 cavities open.

In the FIGURE 12f is shown an additional screen 126 that can be placed over hole 20H to allow the material to be sprinkled rather than the heavier dispersing or discharging. This screen or perforated element 126 can be hinged, pivoted or snapped into the position shown in order that the operator can disperse the sugar into his coffee one time and next sprinkle it on his dessert.

The sugar for material 19 in FIGURES 10, 11 and 12 can be extended to many things, such as salt, tea, coffee and many others.

The dispenser portion can be modified with an adaptor or screw cap where the container 2 would normally fasten to the dispensing elements and in this way the dispenser can be fastened directly onto the coffee container or other container from which material is to be dispensed.

The type of material being dispensed has normally been shown in these drawings as being granular but any powder or even relatively bulky material can be dispensed due to the development of the thin sealer element 70. I wish to further point out that even liquids can be dispensed by using resilient material for the sealer 70, and releaser 20 which would create a liquid tight seal to proportioner 21, which also can be of resilient material to further aid in the sealing if desired. Such resilient material can be rubber or flexible plastic such as the polyethylenes.

Such a dispenser is shown in FIGURE 15 for dispensing cream. As shown it can be held over the item into which the cream is to be dispensed and by operating handle 121 the desired amount of cream can be dispensed. Longer legs or a bracket could hold the container in a dispensing position.

FIGURE 16 shows a cross section of the liquid dispenser with 70R as a resilient material to seal against 25 and 21.

Upon operation of handle 121 proportioner 21 would be filled by material 19 flowing through 70H into proportioning cavity 21H. This dispensing operation has been described in great detail previously. Upon operation of handle 121 to the release position the material is released through hole 20f in releaser 20. Note 20f is shaped to direct liquid into a stream. A spout can even be provided.

FIGURE 16 cross section also shows a cavity 132 in rod 25. This cavity allows projection 134 of stand 133 into this cavity 132.

The projection 134 can be a copper or other good heat conductor with a cooling device 135 such as a thermo electric junction mounted on its end to absorb the heat from 134 which would be drawn through the walls of 25 from the material 19 (cream in this instance) in order to keep this material refrigerated and prevent it from spoiling.

FIGURE 17 shows a longer cooling probe or the element 135 can be this entire projection. One advantage of keeping 135 well within the stand is that circulation can be provided within this stand for the removal of heat in a heat exchange cooling operation. The cooling method is not to be limited to that shown for illustration. The thermo electric junction 135 shown cools by the electric current flow across the junction in a direction to create the cooling. This thermo-electric function is known as the Peltier effect.

This current flow direction can be controlled by a rectifier 140 being in the circuit in order to provide D.C. current from the standard A.C. outlet 143. Batteries could also be mounted in the base for supplying this current.

The legs 144 are not required when the stand 133 is used since the stand and its projection 134 will hold the dispenser from the table so the hole 20f will not become contaminated. It may even be preferable to not have legs when the stand is used in order that the restaurant patron will have to put the dispenser back on the cooling stand rather than set it down on the table.

Note in FIGURE 16 curve 145 in 20 to allow easy replacement of dispenser on stand.

As further decorative elements, lights 136, can be placed in stand 133 in order to give a lighting effect to the table. Such a light can also act as a pilot light to indicate when the cooler is operating.

Drip area 137 is provided in the stand top to collect any drips or leaks from the dispenser.

FIGURE 18 shows another method of cooling the cream by having a recess 138 in the enclosure 2 for the purpose of holding a cooling material, such as ice. Since this dispenser container does not have to be tipped, in the manner of a pitcher, this type of cooling is practical.

A cap 139 can be furnished to cover this recess 138 if desired.

Most illustrations have shown the sealer 70 sealing off one complete section of proportioner 21 before releaser 20 is open. This relationship can be greater so that one or more sections are sealed off. An efficiency would result in waste space and waste turning of dispenser and some further wear and friction but no other major disadvantage.

This ratio can be reduced to smaller than a section, depending upon the thickness of the webs between sections, just so no direct material flow path is between the container and the outside.

Throughout the drawings several types of materials have been illustrated. This is by way of illustrating that different materials, such as plastic or metal, can be used interchangeably, and still come under the invention, except in those cases where the material is expressly specified and limited in the specification. Even transparent or opaque can be interchanged to obtain various artistic effects.

This, then being the complete description of my invention, I claim as my invention the following:

1. A dispenser of materials consisting of proportioning elements movable over a normal range and means movable over a range larger than said normal range for actuating these elements to proportion and dispense the material, means for creating over-riding between said actuating means and the proportioning elements and means for storing proportioning material next to said elements for dispensing.

2. The dispenser of claim 1, wherein the said actuating means is a change of temperature motivated device, and the said over-riding means is a friction clutch.

3. The dispenser of claim 2 wherein the said actuating means when subjected to the change of temperature normally experienced between day and night will produce the said normal range of motion of said elements.

4. The dispenser of claim 2 wherein the actuator causes the said elements to dispense only the lowering of temperature.

5. The dispenser of claim 2 wherein the actuator causes the said elements to dispense only on the raising of the temperature.

6. A dispenser of materials consisting of a container for the material being dispensed, said container at its lower portions abutting a proportioning means, a temperature responsive means located in the upper portion of said container operating a drive shaft connecting said temperature responsive means and said proportioning means, a clutch in said drive shaft for disconnecting the said drive shaft from the said proportioning means, and mounting means for the assembly.

7. A dispenser of powders, granules or liquids consisting of proportioning elements, means for actuating these elements including temperature responsive means to proportion and dispense the material, and means for storing the material in a container abutting to the proportioning elements and means for cooling the liquid by a cooling projection that extends, in a removeable manner, into an intrusion in said container, said cooling projection cooled by a cooling element and means for mounting said cooling element and said projection upon which mounts said dispenser, the means including a drive means and clutch means between said temperature responsive means and said proportioning elements, and stirrers on said drive means.

8. A dispenser of materials in discrete amounts from a source of said materials comprising a discharge means of the type having an element movable over a path of normal range to effect the discharge, a driver movable over a path greater than said normal range, and a mechanical connection between said element and said driver, said connection including a slip clutch to transmit the motion of the driver when within said normal range and slip when beyond said normal range.

References Cited by the Examiner

UNITED STATES PATENTS

| | | | |
|---|---|---|---|
| 685,269 | 10/1901 | Fulton | 185—33 |
| 2,002,039 | 5/1935 | McPhee | 222—284 |
| 2,207,395 | 7/1940 | Brown | 222—284 |
| 2,440,406 | 4/1948 | Kerr. | |
| 2,514,773 | 7/1950 | Kromer | 222—146 X |
| 2,698,022 | 12/1954 | Fahnoe | 222—54 X |
| 2,742,194 | 4/1956 | Brown | 222—360 X |
| 2,948,436 | 8/1960 | Federighi et al. | 222—54 |

FOREIGN PATENTS

| | | |
|---|---|---|
| 24,042 | 12/1899 | Great Britain. |
| 297,785 | 9/1928 | Great Britain. |

ROBERT B. REEVES, *Primary Examiner.*

HADD S. LANE, LOUIS J. DEMBO, *Examiners.*